United States Patent Office 3,105,074
Patented Sept. 24, 1963

3,105,074
NEW DIHYDROTRIAZINE DERIVATIVES AND A PROCESS FOR THEIR MANUFACTURE
Patrick Mamalis, Cheam, England, assignor to Vitamins Limited, London, England, a British company
No Drawing. Filed Nov. 21, 1961, Ser. No. 154,052
Claims priority, application Great Britain Nov. 29, 1960
1 Claim. (Cl. 260—249.9)

This invention relates to substances useful as bactericidal agents.

United States Patent No. 2,976,288 describes and claims substituted triazines of the general formula:

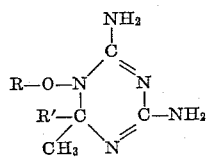

(I)

wherein R is an alkyl radical which may be a straight chain or branched chain and which contains from seven to sixteen carbon atoms inclusive or an arylalkyl radical of the general formula $X.C_6H_4.CH_2$ or of the general formula $X.C_{10}H_6.CH_2$ in which X is hydrogen, a methyl radical or a halogen atom, and R' is hydrogen or a methyl radical.

The said patent also describes and claims a process for the manufacture of the said triazines which comprises reacting an alkoxy- or N-aralkoxy-diguanide of the general formula:

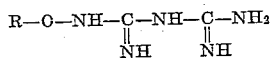

(II)

in which R has the meaning given above, with a carbonyl compound of the general formula:

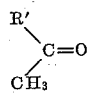

(III)

where R' has the meaning given above in the presence of an acid catalyst.

According to this invention an improved process has been discovered for making the compounds of Patent No. 2,976,288 which can also be used for producing further novel substituted triazines useful as bactericidal agents.

Accordingly the present invention provides a process for the preparation of compounds of the general formula:

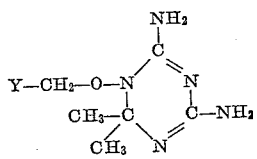

(IV)

and salts thereof in which Y is the hydrogen atom or an alkyl radical or a carbocyclic or heterocyclic ring system such as a benzene, naphthalene, phenanthrene, anthracene, pyrene or quinoline ring, any of which may be substituted by a chlorine or bromine atom or a methyl radical, wherein 4,6-diamino-1,2-dihydro-2,2-dimethyl-1-hydroxy-1,3,5-triazine is reacted with a halide of the general formula Y—$CH_2$—Z in which Z is a chlorine, bromine or iodine atom and Y has the meaning given above in an inert solvent or diluent such as dimethylformamide or a lower alcohol.

The present invention also includes the novel compounds of the general formula (IV) in which Y is a phenanthrene, anthracene, pyrene or quinoline ring, any of which may be substituted by a chlorine or bromine atom or a methyl radical.

The preparation of 4,6-diamino-1,2-dihydro-2,2-dimethyl-1-hydroxy-1,3,5-triazine is described in application Serial No. 154,050 of even date herewith and now abandoned.

The process of the present invention is especially useful in that it is applicable both to extremely labile halomethyl derivatives such as 9-bromomethyl anthracene and to less labile derivatives such as n-decyl bromide. Under the conditions of reaction, only the hydrogen of the hydroxyl group in 4,6-diamino-1,2-dihydro-2,2-dimethyl-1-hydroxy-1,3,5-triazine undergoes replacement, the amino groups being unchanged. The reaction is preferably conducted in the absence of extraneous base, but if required one equivalent of sodium or sodium hydroxide may be used per one mole of 4,6-diamino-1,2-dihydro-2,2-dimethyl-1-hydroxy-1,3,5-triazine. For convenience the hydrochloride of 4,6-diamino-1,2-dihydro-2,2-dimethyl-1-hydroxy-1,3,5-triazine is generally employed from which the free base is obtained by treatment with ethanolic sodium hydroxide.

The following examples, in which the parts are by weight, illustrate the invention.

*Example 1*

1-hydroxy-4,6-diamino-1,2-dihydro-2,2-dimethyl-1,3,5-triazine hydrochloride (19.4 parts) in ethanol (250 parts) was treated with sodium hydroxide (4.0 parts) in ethanol (20 parts). The sodium chloride which separated was removed by filtration and the filtrate evaporated to dryness. The residual solid was suspended in dimethylformamide (200 parts), treated with methyl iodide (17 parts) and stirred at room temperature for 1 hour, then heated for 1 hour and evaported. The residual solid was stirred with a little water, and the insoluble product crystallized from ethanol-ether. 4,6-diamino-1,2-dihydro-2,2-dimethyl-1-methoxy-1,3,5-triazine hydroiodide (21 parts) separated in needles from ethanol-ether, M.P. 217–218° C.

*Example 2*

1-hydroxy - 4,6 - diamino - 1,2 - dihydro-2,2-dimethyl-1,3,5-triazine hydrochloride (19.4 parts) was converted into the base as in Example 1 and the base suspended in dimethylformamide (200 parts). n-Decyl bromide (23 parts) was added and the mixture heated for 30 minutes with stirring. After working up as in Example 1, 4,6-diamino-1,2 - dihydro-2,2 - dimethyl-1-n - decyloxy-1,3,5-triazine hydrobromide was obtained as needles from ethanol-ether, M.P. 193–194° C. (16 parts).

*Example 3*

4,6-diamino-1,2-dihydro-2,2-dimethyl-1-hydroxy - 1,3,5-triazine hydrochloride (7 parts) dissolved in ethanol (150 parts) was treated with sodium metal (1.7 parts) in ethanol (10 parts) and the mixture stirred at 20° C. 2-bromomethylphenanthrene (9.5 parts) was added and stirring continued for 4 hours. Ethanolic hydrogen chloride was added, the insoluble portion removed by filtration and the filtrate evaporated to give a solid. Crystallisation from ethanol-acetone gave 4,6-diamino-1,2-dihydro-2,2-dimethyl - 1 - (2-phenanthrylmethoxy - 1,3,5-triazine hydrochloride, needles, M.P. 223° C. (10.3 parts).

*Example 4*

4,6-diamino-1,2-dihydro-2,2-dimethyl-1 - hydroxy - triazine hydrochloride (13.5 parts) was dissolved in ethanol (100 parts) containing sodium hydroxide (2.8 parts). The insoluble portion was removed by filtration and the clear solution evaporated to dryness. The residual solid was partially dissolved in dimethylformamide (50 parts) and treated with 9-bromomethylanthracene (18.2 parts) when an exothermic reaction took place. The solution was now heated for 2 minutes then evaporated to give a syrup which crystallised on rubbing with acetone. 4,6-diamino-1,2-dihydro-2,2-dimethyl-1-(9 - anthrylmethoxy)-1,3,5-triazine hydrobromide crystallised from ethanol as needles, M.P. 218–219° C. (30 parts).

*Example 5*

4,6-diamino-1,2-dihydro-2,2 - dimethyl-1 - hydroxy-triazine (2.6 parts) suspended in dimethylformamide (50 parts) was treated with 8-bromomethylquinoline (3.65 parts) and heated at 85° C. for 15 minutes. Evaporation of the solution left a solid which was crystallised from aqueous ethanol to give 4,6-diamino-1,2-dihydro-2,2-dimethyl-1-(8-quinolylmethoxy)-1,3,5 - triazine hydrobromide as needles, M.P. 251–252° C. (3.7 parts).

The following additional compounds of the present invention have been prepared by methods analogous to those of the preceding examples. These compounds are of the general formula (IV), the values of Y being as stated in the table.

| Example | (IV) Y | Base or Salt | M.P., °C. |
|---|---|---|---|
| 6 | p-Tertiary-butylphenyl | Base | 246 |
| 7 | 3,4-Dichlorophenyl | Hydrochloride | 227 |
| 8 | 1-Naphthyl | Hydrobromide | 205 |
| 9 | 2-Naphthyl | do | 219 |
| 10 | 1-Bromo-2-naphthyl | Hydrochloride | 217 |
| 11 | do | Hydrobromide | 217 |
| 12 | 1-Bromo-4-naphthyl | Hydrochloride | 225 |
| 13 | 9-Phenanthryl | do | 235 |
| 14 | 1-Phenanthryl | do | 228 |
| 15 | 3-Phenanthryl | do | 214 |
| 16 | do | Hydrobromide | 230 |
| 17 | 9-Bromo-10-anthryl | do | 219 |
| 18 | 3-Pyrenyl | do | 238 |
| 19 | 8-Quinolyl | Dihydrochloride | 242 |
| 20 | 2-Quinolyl | Hydrobromide | 186 |
| 21 | 4-Methoxycarbonylphenyl | do | 219.5–220.5 |
| 22 | 2-Methoxycarbonylphenyl | do | 225–228 |
| 23 | 1-Chloro-2-naphthyl | do | 223–224 |
| 24 | 3,4-Dichlorophenyl | Saccharinate | 183 |
| 25 | 1-Naphthyl | Acetate | 183–185 |
| 26 | do | Acid maleate | 202–203 |
| 27 | do | Succinate | 225–226 |
| 28 | do | Acid phthalate | 195 |
| 29 | do | Phosphate | 210–211 |
| 30 | do | p-Nitrobenzoate | 230–232 |
| 31 | do | Stearate | 149–150 |
| 32 | do | Saccharinate | 207 |
| 33 | 2-Naphthyl | Acetate | 160 |
| 34 | do | Acid maleate | 195 |
| 35 | do | p-Nitrobenzoate | 218 |
| 36 | do | Mandelate | 182–183 |
| 37 | do | N-Acetylglycinate | 194–195 |
| 38 | 1-Chloro-2-naphthyl | Saccharinate | 185–186 |
| 39 | 1-Bromo-2-naphthyl | Acetate | 186–187 |
| 40 | 2-Phenenthryl | Saccharinate | 186–188 |
| 41 | 8-Quinolyl | do | 234–235 |

I claim:

A process for the preparation of a compound selected from the group consisting of compounds of the formula:

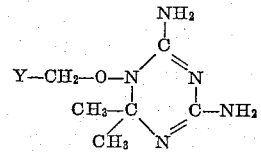

and salts thereof in which Y is selected from the group consisting of hydrogen, alkyl radicals of up to fourteen carbon atoms and phenyl, naphthyl, phenanthryl, pyrenyl and quinolyl radicals, and said radicals substituted by one of the substituents chlorine, bromine, lower alkyl and carbomethoxy, which comprises reacting 4,6-diamino-1,2-dihydro-2,2-dimethyl-1-hydroxy-1,3,5-triazine with a halide of the formula Y—CH$_2$—Z in which Z is a halogen atom having an atomic weight greater than 35 and Y has the meaning hereinbefore given in an inert reaction medium and recovering the compound so produced.

References Cited in the file of this patent

UNITED STATES PATENTS 2,720,480  Wolf _____ Oct. 11, 1955
2,976,288  Green et al. _____ Mar. 21, 1961

OTHER REFERENCES

Conant et al.: The Chemistry of Organic Compounds, 3rd ed., 1947. The MacMillan Co., p. 560.